United States Patent
Tanabe et al.

(10) Patent No.: US 10,601,843 B2
(45) Date of Patent: Mar. 24, 2020

(54) COMMUNICATION METHOD, NON-TRANSITORY COMPUTER-READABLE RECORDING MEDIUM AND COMMUNICATION DEVICE USING SAME

(71) Applicant: Panasonic Intellectual Property Management Co., Ltd., Osaka (JP)

(72) Inventors: Masato Tanabe, Aichi (JP); Jun Anzai, Kanagawa (JP); Yoshihiko Kitamura, Tokyo (JP); Seiji Sakaki, Kanagawa (JP); Yoshihiro Ujiie, Osaka (JP); Hideki Matsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 15/578,760

(22) PCT Filed: Jun. 28, 2016

(86) PCT No.: PCT/JP2016/003095
§ 371 (c)(1),
(2) Date: Dec. 1, 2017

(87) PCT Pub. No.: WO2017/006537
PCT Pub. Date: Jan. 12, 2017

(65) Prior Publication Data
US 2018/0159870 A1  Jun. 7, 2018

(30) Foreign Application Priority Data

Jul. 3, 2015 (JP) .................. 2015-134272

(51) Int. Cl.
*H04L 29/06* (2006.01)
*H04L 12/40* (2006.01)
*H04W 4/48* (2018.01)

(52) U.S. Cl.
CPC .......... *H04L 63/1416* (2013.01); *H04L 12/40* (2013.01); *H04L 12/40013* (2013.01);
(Continued)

(58) Field of Classification Search
CPC . H04L 63/1416; H04L 63/0263; H04L 12/40; H04L 63/1441; H04L 2012/40215;
(Continued)

(56) References Cited

U.S. PATENT DOCUMENTS 9,843,594 B1 * 12/2017 Evans ................. H04L 63/1425
2012/0185125 A1 * 7/2012 Kitagawa ............... G07C 5/085
701/32.7

(Continued)

FOREIGN PATENT DOCUMENTS

JP  2009-194497  8/2009
JP  2014-146868  8/2014

OTHER PUBLICATIONS

International Search Report of PCT application No. PCT/JP2016/003095 dated Sep. 13, 2016.

*Primary Examiner* — Huan V Doan
(74) *Attorney, Agent, or Firm* — Greenblum & Bernstein, P.L.C.

(57) ABSTRACT

A communication device includes: a communication section that transmits and receives a message in a network; an acquisition unit that acquires state information on a state of an object for which the network is provided; an estimation unit that estimates the state of the object based on the state information acquired in the acquisition unit; a setting unit that sets a filtering rule based on the state estimated in the estimation unit; and a filter unit that executes filtering processing for the message in accordance with the filtering rule set in the setting unit.

7 Claims, 8 Drawing Sheets

(52) U.S. Cl.
CPC ...... *H04L 63/0254* (2013.01); *H04L 63/0263* (2013.01); *H04W 4/48* (2018.02); *H04L 63/1441* (2013.01); *H04L 2012/40215* (2013.01); *H04L 2012/40273* (2013.01)

(58) Field of Classification Search
CPC ....... H04L 2012/40273; H04L 63/0254; H04L 12/40013; H04W 4/48
See application file for complete search history.

(56) References Cited

U.S. PATENT DOCUMENTS

| | | | |
|---|---|---|---|
| 2015/0020152 A1* | 1/2015 | Litichever | H04L 63/14 726/1 |
| 2015/0191135 A1* | 7/2015 | Ben Noon | B60R 16/023 726/22 |
| 2015/0358351 A1 | 12/2015 | Otsuka et al. | |
| 2017/0134342 A1* | 5/2017 | Beyer | H04L 12/42 |
| 2018/0196941 A1* | 7/2018 | Ruvio | H04L 63/1425 |

* cited by examiner

| Recessive | | | | | | | | | | | | |
|---|---|---|---|---|---|---|---|---|---|---|---|---|
| Dominant | SOF | ID | RTR | IDE | r0 | DLC | Data Field | CRC | CRC Delim iter | Ack | Ack Delim iter | EOF |
| | 1 | 11 | 1 | 1 | 1 | 4 | 0~64 | 15 | 1 | 1 | 1 | 7 |

| INSTRUMENT | CONNECTION STATE |
|---|---|
| SECOND ECU | CONNECTED |
| THIRD ECU | UNCONNECTED → CONNECTED |

FIG. 8B

| CAN ID |
|---|
| 0x100 |
| 0x200 |
| 0x300 |

| CAN ID |
|---|
| 0x110 |
| 0x210 |
| 0x310 |

| CAN ID |
|---|
| 0x120 |
| 0x220 |

COMMUNICATION METHOD, NON-TRANSITORY COMPUTER-READABLE RECORDING MEDIUM AND COMMUNICATION DEVICE USING SAME

This application is a U.S. national stage application of the PCT International Application No. PCT/JP2016/003095 filed on Jun. 28, 2016, which claims the benefit of foreign priority of Japanese patent application 2015-134272 filed on Jul. 3, 2015, the contents all of which are incorporated herein by reference.

TECHNICAL FIELD

The present invention relates to a communication method in a communication system connected to a bus, and relates to a communication device using the same.

BACKGROUND ART

In an in-vehicle network, it is required to sense and prevent an attack that causes unauthorized data to invade and erroneously operate the in-vehicle network. To fulfill this requirement, an ID to be monitored is stored in advance in a filter table, and a transmission cycle of a message with the stored ID is checked, whereby such invasion of the unauthorized data is detected. That is, if a regular transmission node is periodically transmitting a message of a predetermined ID, when an unauthorized transmission node transmits unauthorized data in a spoofing attack, then the unauthorized data is detectable since a cycle of the unauthorized data is abnormal (for example, see PTL 1).

CITATION LIST

Patent Literature

PTL 1: Unexamined Japanese Patent Publication No. 2014-146868

SUMMARY OF THE INVENTION

It is an object of the present invention to provide a technique for enhancing detection accuracy for such an unauthorized message.

A communication device according to a certain aspect of the present invention includes a communication section that transmits and receives a message, an acquisition unit that acquires state information, an estimation unit that estimates a state of an object, a setting unit that sets a filtering rule, and a filter unit. The communication section that transmits and receives a message transmits and receives a message in a network. The acquisition unit that acquires state information acquires state information on a state of an object for which the network is provided. The estimation unit that estimates a state of an object estimates the state of the object based on the state information acquired in the acquisition unit. The setting unit that sets a filtering rule sets the filtering rule based on the state estimated in the estimation unit. The filter unit executes filtering processing for the message in accordance with the filtering rule set in the setting unit.

Another aspect of the present invention is a communication method. This method includes transmitting and receiving a message, acquiring state information, estimating a state of an object, setting a filtering rule, and executing filtering processing. In the transmitting and receiving a message, a message in a network is transmitted and received. In the acquiring state information, state information on a state of an object for which the network is provided is acquired. In the estimating the state of the object, the state of the object is estimated based on the acquired state information. In the setting filtering rule, a filtering rule is set based on the estimated state. In the executing filtering processing for the message, filtering processing for the message is executed in accordance with the set filtering rule.

Note that any desired combinations of the above-described constituent elements and modifications of the features of the present invention in methods, devices, systems, computer programs, recording media containing the computer programs, or other entities are still effective as other aspects of the present invention.

According to the present invention, the detection accuracy for the unauthorized message can be enhanced.

DESCRIPTION OF EMBODIMENTS

Prior to describing exemplary embodiments of the present invention, problems of a conventional communication device will be briefly described. In an in-vehicle network, in some cases, a regular transmission node may not transmit an authorized message or change a type and content of the message as a state of a vehicle is changing, the state including a behavior of the vehicle and a condition of an electrical component mounted on the vehicle. When the above is not taken into consideration, a situation is assumed, in which an unauthorized message cannot be detected. For example, when the unauthorized message is transmitted to an unauthorized transmission node in an authorized cycle when it is an authorized situation that the regular transmission node does not transmit a message, then the communication device of PTL 1 cannot detect it as an unauthorized message.

First Exemplary Embodiment

Prior to specifically describing a first exemplary embodiment of the present invention, an outline of the first exemplary embodiment will be described herein. The first exemplary embodiment relates to a communication device that detects an unauthorized message in a controller area network (CAN) which is an in-vehicle network. CAN is a serial communication protocol that adopts a bus-type network. A message from each communication device connected to a bus is broadcast to all communication devices connected to the bus. The message does not include identification information of such a transmission source communication device and such destination communication devices. Hence, each of the communication devices which have received the message cannot simply determine whether the received message is a message from an authorized communication device. Therefore, it is desirable to enhance detection accuracy for the unauthorized message.

A communication device according to this exemplary embodiment holds, as a rule, a communication rule of such an authorized message, the communication rule being based on communication specifications of the CAN. Here, an example of the communication rule is a CAN message ID (hereinafter referred to as "CAN ID") transmittable in the target CAN. Moreover, an example of the communication rule may be, for each CAN ID, a data length (DLC), a transmission cycle, a transmission frequency, possible values of data, rules for increasing/decreasing data, and the like. The communication device has a filtering rule set so as to correspond to the communication specifications, and performs filtering processing for the CAN message, which is to be transmitted/received, in accordance with the filtering rule. Moreover, the communication device determines whether to output the message to an application or a CAN bus based on a determination result of the filtering processing.

As mentioned above, the message to be transmitted/received changes in response to a state of the vehicle provided with the CAN. The communication device enhances the detection accuracy for the unauthorized message by using this for the filtering rule. That is, the communication device dynamically changes the filtering rule in response to the state of the vehicle.

Figure 1:
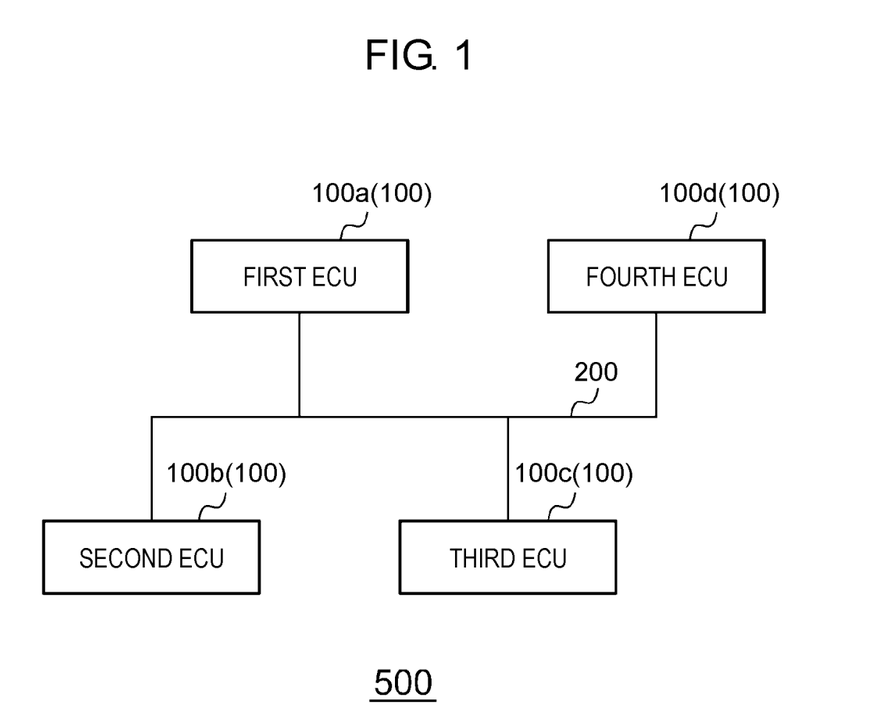
FIG. 1 is a diagram illustrating a configuration of a CAN system according to a first exemplary embodiment of the present invention.

FIG. 1 illustrates a configuration of CAN system 500 according to the first exemplary embodiment of the present invention. CAN system 500 includes: first electronic control unit (ECU) 100*a*, second ECU 100*b*, third ECU 100*c*, and fourth ECU 100*d*, which are collectively referred to as ECUs 100; and CAN bus 200. Not that a number of ECUs 100 included in CAN system 500 is not limited to "4".

Each of ECUs 100 is a unit that controls an engine, a motor, a meter, a transmission, a brake, an airbag, a lamp, a power steering, a power window, a car air conditioner or the like, which are mounted on the vehicle, and is equipped with a microcontroller, for example. Each ECU 100 is connected to CAN bus 200, and executes a CAN communication. Therefore, each ECU 100 corresponds to the above-mentioned "communication device". CAN bus 200 includes, for example, two communication lines, and transmits a signal by a differential of a voltage.

In the CAN, an access control system called carrier sense multiple access with collision avoidance (CSMA/CA) is adopted. In the CSMA/CA, ECU 100 that started the transmission to CAN bus 200 first acquires a transmission right. Note that, when a plurality of ECUs 100 makes simultaneous transmission, communication arbitration (bus arbitration) is performed. In the CAN, the one with a smaller CAN ID takes precedence.

Figure 2:
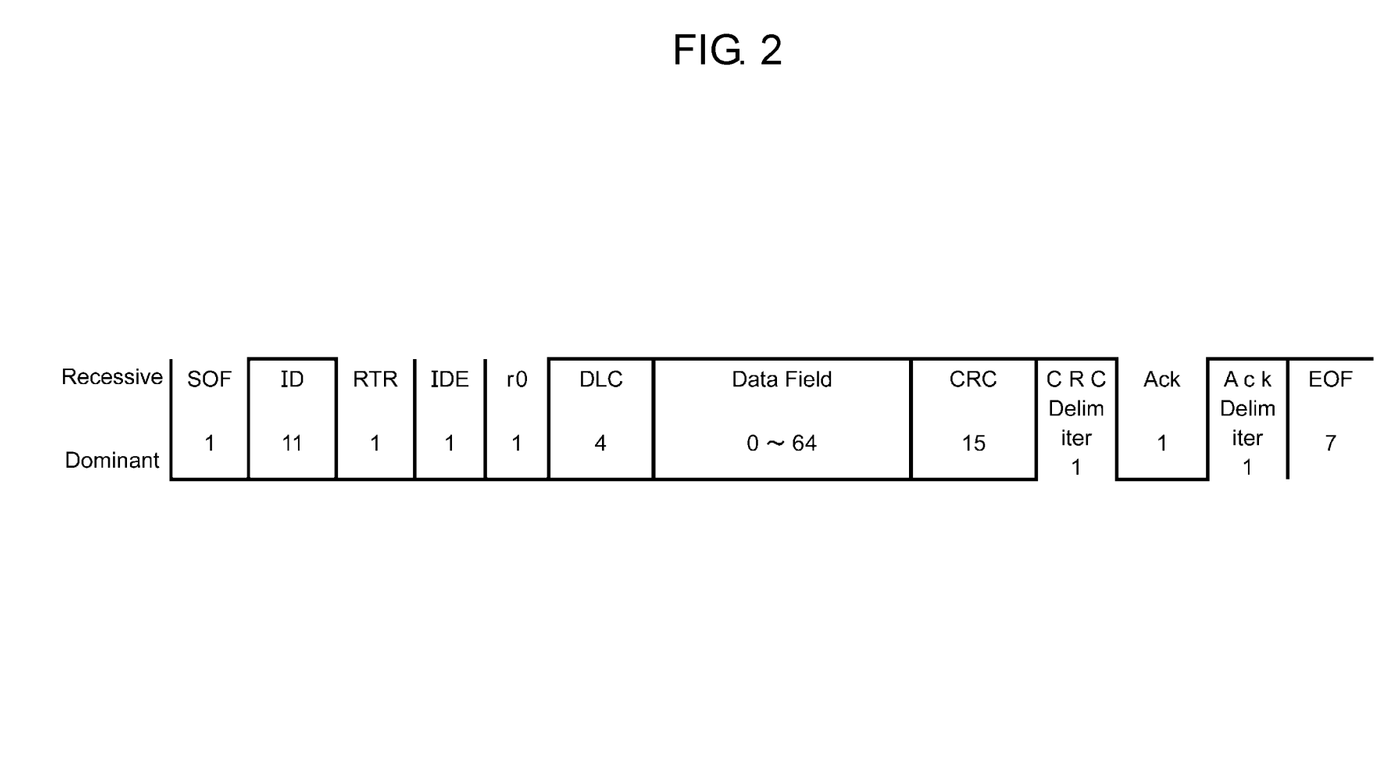
FIG. 2 is a diagram illustrating a data frame of a standard format for use in the CAN system of FIG. 1.

FIG. 2 illustrates a data frame (defined in ISO 11898-1) of a standard format for use in CAN system 500. As illustrated, an SOF, an ID field, an RTR, an IDE, an r0, a DLC, a data field, a CRC delimiter, an Ack, an Ack delimiter, and an EOF are disposed in order from the top, whereby a data frame is composed. A number in each of boxes indicates a number of bits. Moreover, such an item in which a top of the box is opened is an item that always takes "0", and such an item in which a bottom of the box is opened is an item that always takes "1". Such an item in which a top and a bottom are not opened is an item that can take both "0" and "1". Note that a data frame in a transmittable state is called a message.

The above-mentioned CAN ID is stored in the ID field. The CAN ID is identification information for indicating a type and priority of the message. The message in the CAN includes a specific notification item in a specific processing target in the vehicle. The processing target includes a specific monitoring target and a specific control target. For example, as such a message relating to the specific processing target in the vehicle, there are a message including speed information, a message issuing an instruction to open and close a door, and the like. Moreover, a plurality of notification items may sometimes be set for the same processing target. For example, for one meter, it is possible to set a plurality of notification items such as a notification item for issuing a notice on a rotating speed of an engine, and a notification item for issuing a notice on an engine water temperature.

The CAN ID is associated with the specific notification item of the specific processing target, which is included in the message to be transmitted. ECU 100, which has received the message, determines the content of the specific notification item, which is included in the message, based on the CAN ID. As illustrated in FIG. 2, the data frame of the CAN does not include a transmission destination address and a transmission source address. Therefore, ECU 100, which has received the message, cannot determine whether the received message is a message from an authorized communication partner. For example, the message including the rotating speed of the engine is transmitted from ECU 100 of the engine. When a message given the same CAN ID as a CAN ID given to the above-described message is transmitted from unauthorized ECU 100, ECU 100, which has received the message, cannot determine whether the received message is a message from authorized engine ECU 100 or a message from unauthorized ECU 100.

When unauthorized ECU 100 impersonates such transmitting ECU 100 to transmit unauthorized information, and such receiving ECU 100 processes the message concerned as an authorized message, then subsequent processing (control for accessories, and the like) is adversely affected. For example, unauthorized ECU 100 poses as ECU 100 of the engine to transmit the message including the rotating speed of the engine, whereby the control of ECU 100 for a meter that has received the message concerned is adversely affected. As described above, in the CAN protocol, spoofing is likely to occur. Moreover, since the message is broadcast to CAN bus 200, eavesdropping is more likely to occur than in unicast transmission.

Figure 3:
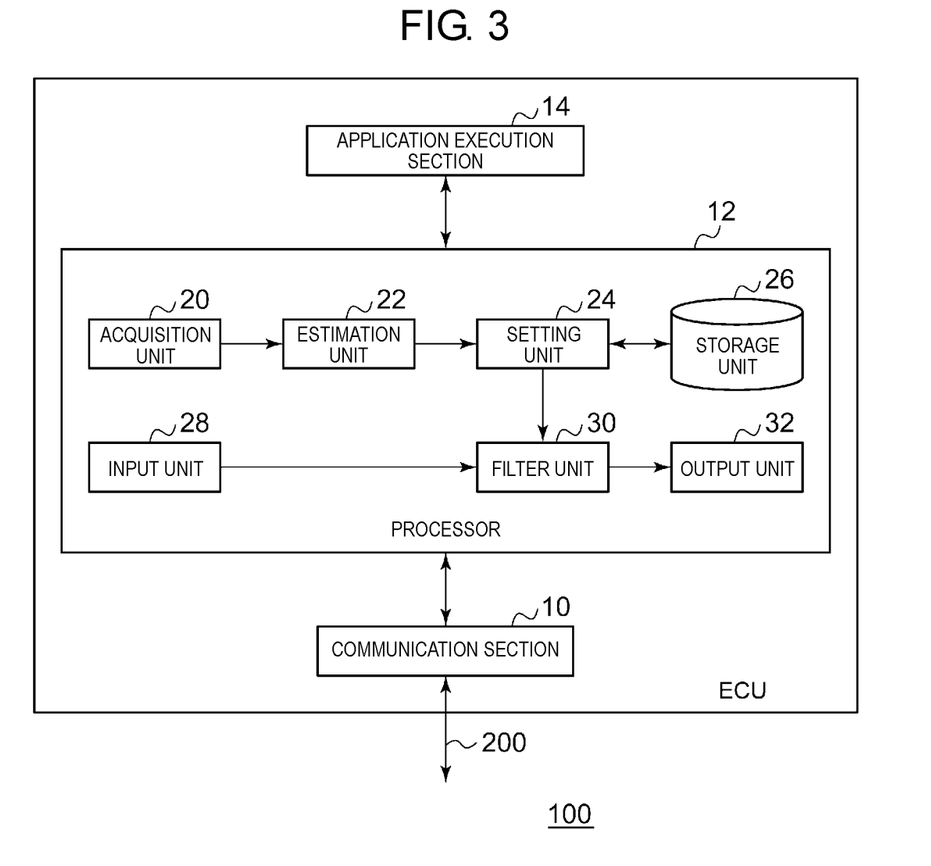
FIG. 3 is a diagram illustrating a configuration of an ECU in FIG. 1.

FIG. 3 illustrates a configuration of ECU 100. ECU 100 includes communication section 10, processor 12, and application execution section 14. Processor 12 includes acquisition unit 20, estimation unit 22, setting unit 24, storage unit 26, input unit 28, filter unit 30, and output unit 32.

Application execution section 14 connects to processing targets (for example, an engine, a steering, a brake, and other auxiliary devices) of respective ECUs 100, and obtains status information or instruction information from these processing targets. Based on the information acquired from each of the processing targets, application execution section 14 generates data to be broadcast in the CAN, and outputs the data to processor 12. Moreover, from processor 12, application execution section 14 receives data included in the message received from CAN bus 200, and controls the processing target in response to the data.

Communication section 10 transmits and receives a message in CAN system 500 that is a network. Specifically, the communication section 10 broadcasts a message which is generated by processor 12 and includes the data generated in application execution section 14, to CAN bus 200. Communication section 10 receives such a message, which is generated by another ECU 100 and is broadcast to CAN bus 200, from CAN bus 200. Communication section 10 passes the received message to processor 12.

Processor 12 is disposed between application execution section 14 and communication section 10. Processor 12 receives the data from application execution section 14, and generates a message including the data. Processor 12 executes filtering processing, which will be described later, for the generated message, and then outputs the message to communication section 10. Meanwhile, processor 12 inputs a message from communication section 10, and executes the filtering processing, which will be described later, for the received message. Processor 12 extracts data, which is included in the message subjected to the filtering processing, and then outputs the extracted data to application execution section 14. In the filtering processing, processor 12 selects only such messages which are not unauthorized. The filtering processing will be mainly described below.

Acquisition unit 20 acquires state information on a state of an object provided with CAN system 500, for example, on a state of the vehicle. The state of the vehicle is whether an ignition is on, whether an accessory position (ACC) is on, a vehicle speed, and the like, which are then included in the state information. For example, acquisition unit 20 acquires the state information from a sensor or the like (not illustrated). Moreover, the acquisition unit 20 may acquire the state information from CAN bus 200. Acquisition unit 20 outputs the acquired state information to estimation unit 22.

Estimation unit 22 receives the state information output from acquisition unit 20. Estimation unit 22 estimates the state of the vehicle based on the state information. Estimation unit 22 estimates, as a "first state", a state in which the ACC is on, for example, based on such state information indicating that the ACC is on. Subsequently to this, estimation unit 22 estimates, as a "second state", information that the ignition is on, for example, based on such state information indicating that the ignition is on. Note that the states and transitions of the states, which are estimated in estimation unit 22, are not limited to these. Estimation unit 22 outputs the estimated states of the vehicle to setting unit 24.

A state of the vehicle at predetermined timing should be specified to either of the first state and the second state. Even when a transition is made from the first state to the second state, the state of the vehicle is specified as the first state or the second state. However, there is a possibility that a deviation might occur between the states of the vehicle estimated in respective ECUs 100 in FIG. 1. For example, first ECU 100*a* estimates that the state of the vehicle is the first state, and second ECU 100*b* estimates that the state of the vehicle is the second state. In this case, timing at which the state of the vehicle is estimated to be the second state in second ECU 100*b* is later than timing at which the state of the vehicle is estimated to be the second state in first ECU 100*a*.

Storage unit 26 stores the communication rule of the authorized message as a rule. As mentioned above, the stored rule includes the CAN ID, the DLC for each CAN ID, the transmission cycle for each CAN ID, the transmission frequency for each CAN ID, the data for each CAN ID, and the like. Storage unit 26 stores a list of information included in the rule.

Setting unit 24 receives the state of the vehicle from estimation unit 22. Setting unit 24 sets the filtering rule based on the state of the vehicle, which is estimated by estimation unit 22. Specifically, from the list of information, which is stored in storage unit 26, setting unit 24 selects, as the filtering rule, some information suitable for the state of the vehicle, which is estimated by estimation unit 22. Note that, in setting unit 24, a correspondence relationship between the state of the vehicle and some information to be selected is stored in advance. The list of the information, which is stored in storage unit 26, includes not only the CAN ID but also the DLC, the transmission cycle, and the like, but only the CAN ID is described here in order to clarify the description.

Figure 4A:
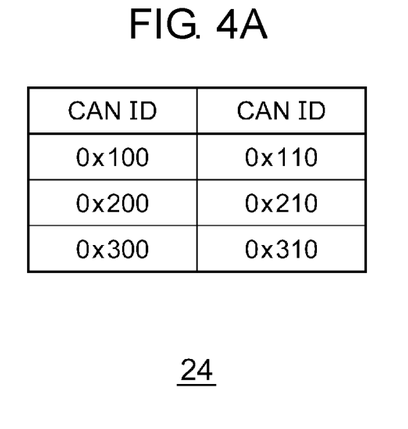
FIG. 4A is a table illustrating a data structure of a filtering rule set in a setting unit in FIG. 3.

For example, when estimation unit 22 estimates the first state, the storage unit 26 sets a filtering rule corresponding to the first state. FIGS. 4A and 4B illustrate data structures of the filtering rule set in setting unit 24. FIG. 4A illustrates the filtering rule set in the first state, that is, in the state in which the ACC is on. As illustrated, "0x100", "0x200", "0x300", "0x110", "0x210" and "0x310", which are such CAN IDs, are set. The description returns to FIG. 3.

Figure 4B:
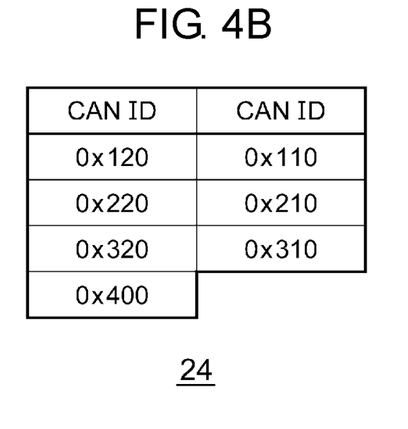
FIG. 4B is a table illustrating a data structure of a filtering rule set in the setting unit in FIG. 3.

For example, when estimation unit 22 estimates the second state, storage unit 26 sets a filtering rule corresponding to the second state. FIG. 4B illustrates the filtering rule set in the second state, that is, in the state in which the ignition is on. As illustrated, "0x120", "0x220", "0x320", "0x400", "0x110", "0x210" and "0x310", which are such CAN IDs, are set. Note that, since "0x110", "0x210" and "0x310", which are the CAN IDs, are also included in the first state, "0x110", "0x210" and "0x310" are CAN IDs which can be commonly set in a plurality of the states. Moreover, since "0x120", "0x220", "0x320" and "0x400", which are the CAN IDs, are not included in the first state, "0x120", "0x220", "0x320" and "0x400" are CAN IDs which can be set only in the second state. The description returns to FIG. 3.

As mentioned above, when the vehicle shifts from the first state to the second state, there is a case where the estimated state differs for each ECU 100. For example, there is a case where a message is transmitted by first ECU 100*a* estimating that the vehicle is in the first state, and where the message is received by second ECU 100*b* estimating that the vehicle is in the second state. In this case, for example, first ECU 100*a* transmits a message of the CAN ID "0x100" as an authorized message, but second ECU 100*b* does not include such a CAN-ID in the filtering rule. As a result, second ECU 100*b* does not receive the message, and determines that the message is an unauthorized message.

In order to cope with this, when estimation unit 22 estimates the transition from the first state to the second state, setting unit 24 sets a filtering rule, which corresponds to the first state and the second state, for a predetermined period after the shift. That is, a filtering rule to allow both states before and after the state transition is set. Here, the predetermined period is set so as to be a period until the difference in the state for each ECU 100, which is caused by the state shift, is eliminated, and a value of the predetermined period is determined by simulation, experiment, and the like. In this predetermined period, setting unit 24 sets such a filtering rule that includes, for example, the CAN ID illustrated in FIG. 4A and the CAN ID illustrated in FIG. 4B. After elapse of the predetermined period, setting unit 24 sets the filtering rule, which corresponds only to the second state, as mentioned above.

When ECU 100 corresponds to such a transmission side, input unit 28 receives the message including the data from application execution section 14. Meanwhile, when ECU 100 corresponds to such a receiving side, input unit 28 receives the message from communication section 10. Input unit 28 outputs the message to filter unit 30.

Figure 5:
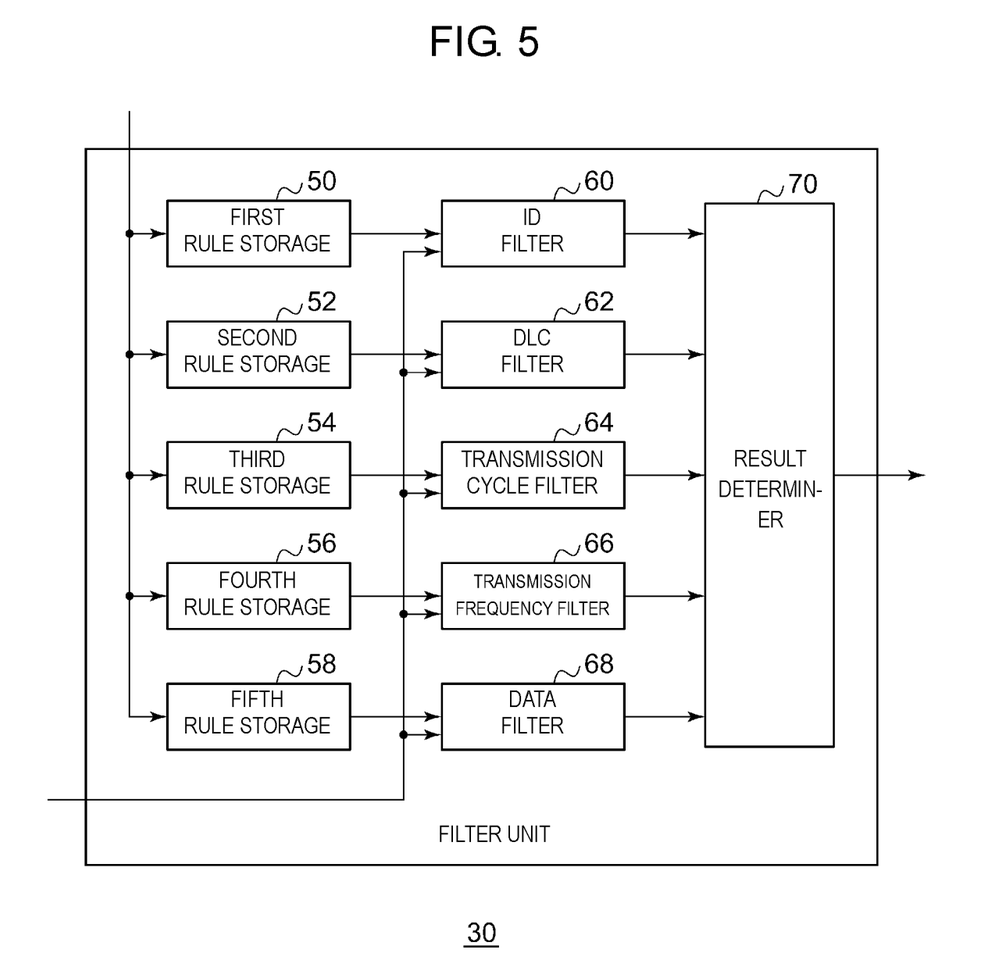
FIG. 5 is a diagram illustrating a configuration of a filter in FIG. 3.

Filter unit 30 receives the message from input unit 28. Filter unit 30 executes the filtering processing for the message in accordance with the filtering rule set in setting unit 24. FIG. 5 illustrates a configuration of filter unit 30. Filter unit 30 includes first rule storage 50, second rule storage 52, third rule storage 54, fourth rule storage 56, fifth rule storage 58, ID filter 60, DLC filter 62, transmission cycle filter 64, transmission frequency filter 66, data filter 68, and result determiner 70.

First rule storage 50 stores a rule on the CAN ID among the filtering rules set in setting unit 24. First rule storage 50 stores, for example, the CAN ID as illustrated in FIG. 4A or FIG. 4B. Note that, since setting unit 24 changes the filtering rule in response to the state of the vehicle, the rule stored in first rule storage 50 is also changed. ID filter 60 executes filtering processing by the CAN ID for the message from input unit 28. That is, ID filter 60 extracts a message including the CAN ID stored in first rule storage 50.

Second rule storage 52 stores a rule on the DLC among the filtering rules set in setting unit 24. Third rule storage 54 stores a rule on the transmission cycle among the filtering rules set in setting unit 24. Fourth rule storage 56 stores a rule on the transmission frequency among the filtering rules set in setting unit 24. This is determined, for example, so as to exclude a case where the message is transmitted at an abnormally high frequency. Fifth rule storage 58 stores a rule on the data among the filtering rules set in setting unit 24. This rule is determined, for example, so as to exclude a case where a portion which is a fixed value is an abnormal value, and to exclude a case where a trend of increase/decrease is abnormal. Note that the rules stored in second rule storage 52 to fifth rule storage 58 are changed by setting unit 24 in response to the state of the vehicle in a similar way to first rule storage 50.

DLC filter 62 executes filtering processing by the DLC, which is stored in second rule storage 52, for the message from input unit 28. Transmission cycle filter 64 executes filtering processing by the transmission cycle, which is stored in third rule storage 54, for the message from input unit 28. Transmission frequency filter 66 executes filtering processing by the transmission frequency, which is stored in fourth rule storage 56, for the message from input unit 28. Data filter 68 executes filtering processing by the data, which is stored in fifth rule storage 58, for the message from input unit 28. DLC filter 62 to data filter 68 execute similar processing to that of ID filter 60.

Result determiner 70 receives results of the filtering processing in ID filter 60 to data filter 68. Result determiner 70 executes a determination based on the results of the filtering processing. For example, when the messages are extracted in all of ID filter 60 to data filter 68, result determiner 70 determines that the extracted messages are authorized messages. Meanwhile, when the message is not extracted in any of ID filter 60 to data filter 68, result determiner 70 determines that the message from input unit 28 is an unauthorized message. When having determined that the extracted messages are such authorized messages, result determiner 70 outputs the messages. Meanwhile, when determining that the extracted message is such an unauthorized message, result determiner 70 does not output anything, or outputs an effect that the unauthorized message has been detected.

Note that, in the above description, when the messages are extracted in all of ID filter 60 to data filter 68, result determiner 70 determines that the extracted messages are the authorized messages. Alternatively, when the messages are extracted in one or more of ID filter 60 to data filter 68, result determiner 70 may determine that the extracted messages are the authorized messages. At this time, if this condition is not satisfied (for example, if a number of determination results that the extracted messages are the authorized messages among the results of the filtering processing in ID filter 60 to data filter 68 is a predetermined number n or less), result determiner 70 may determine that the message from input unit 28 is the unauthorized message. In this case, when the message is not extracted in any of ID filter 60 to data filter 68, result determiner 70 may determine that the message from input unit 28 is the unauthorized message. The description returns to FIG. 3.

Output unit 32 receives the message from result determiner 70. When ECU 100 corresponds to the transmission side, output unit 32 outputs the message to communication section 10. Meanwhile, when ECU 100 corresponds to the receiving side, output unit 32 outputs the data, which is included in the message, to application execution section 14.

In terms of hardware, this configuration is realized by a central processing unit (CPU), a memory and other large scale integrated circuits (LSIs) in an arbitrary computer, and in terms of software, realized by a program loaded in the memory. Here, functional blocks realized by cooperation of these are illustrated. Hence, it will be understood by those skilled in the art that these functional blocks can be realized in various forms by hardware alone or by combination of hardware and software.

Figure 6:
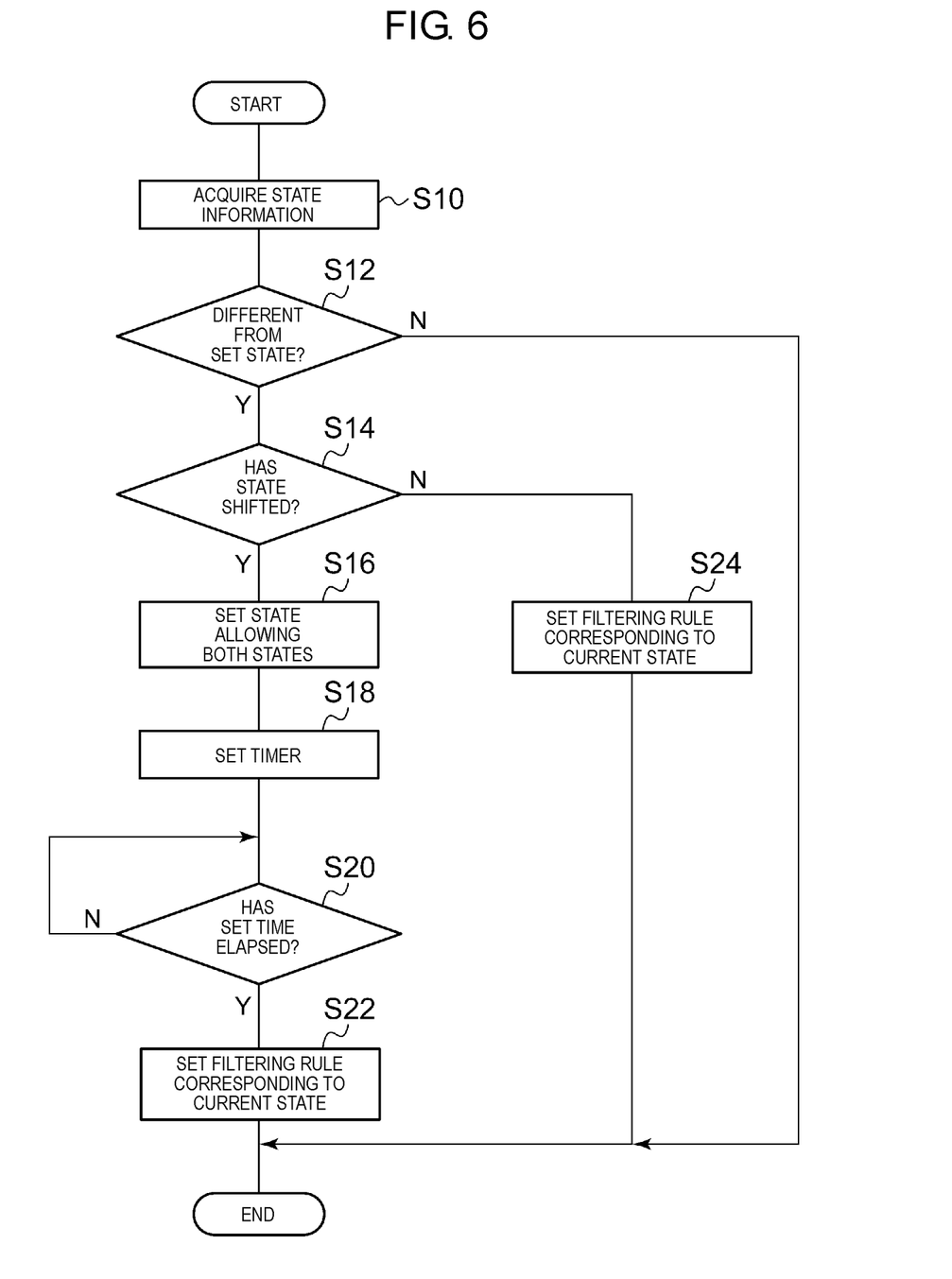
FIG. 6 is a flowchart illustrating a setting procedure performed by the ECU in FIG. 3.

An operation of ECU 100 configured as described above will now be described herein. FIG. 6 is a flowchart illustrating a setting procedure performed by ECU 100. Acquisition unit 20 acquires the state information (S10). In estimation unit 22, if the state in the state information is different from a set state (Y in S12), and the state has shifted (Y in S14), then setting unit 24 sets a filtering rule corresponding to such a state that allows both states (S16). Setting unit 24 sets a timer (S18). If a set time has not elapsed (N in S20), then setting unit 24 stands by. If the set time has elapsed (Y in S20), setting unit 24 sets a filtering rule corresponding to a current state (S22). In estimation unit 22, if the state has not shifted (N in S 14), setting unit 24 sets the filtering rule corresponding to the current state (S24). In estimation unit 22, if the state in the state information is not different from the set state (N in S12), then Step 14 to Step 24 are skipped.

In accordance with this exemplary embodiment, the filtering rule corresponding to the state of the vehicle, which is estimated based on the state information, is set, and accordingly, only the filtering rule corresponding to the state of the vehicle at that time can be used. Moreover, since only the filtering rule corresponding to the state of the vehicle is used, the detection accuracy for the unauthorized message can be enhanced. Moreover, when the transition from the first state to the second state is estimated, the filtering rule corresponding to the first state and the second state is set, and accordingly, even if a deviation occurs between the states of the ECUs, the authorized message can be accurately extracted. Furthermore, since the authorized message is accurately extracted, the detection accuracy for the unauthorized message can be enhanced. Moreover, since a rule set is dynamically switched in response to such a varying state of the vehicle, a detection rate for the unauthorized message can be enhanced, and a false-detection rate can be reduced.

Second Exemplary Embodiment

Next, a second exemplary embodiment will be described. In a similar way to the first exemplary embodiment, the second exemplary embodiment relates to such a communication device that detects the unauthorized message in the CAN, that is, relates to the ECU. The second exemplary embodiment relates to further enhancement of the estimation accuracy for the state of the vehicle, which is based on plural types of the state information, when the plural types of the state information are acquired. CAN system 500 and ECU 100 according to the second exemplary embodiment are of the same types as those of FIG. 1 and FIG. 3. Here, difference from the previous one will be mainly described.

Acquisition unit 20 in FIG. 3 acquires the plural types of the state information. In particular, it is assumed that the plural types of the state information have contents related to each other. For example, acquisition unit 20 and a vehicle speed sensor are directly connected to each other by a conductive cable that transmits only one signal, and acquisition unit 20 acquires a vehicle speed pulse from the vehicle speed sensor. Moreover, acquisition unit 20 acquires vehicle speed information by receiving a message, in which the vehicle speed information is included as data, via CAN bus 200. As described above, the vehicle speed pulse and the vehicle speed information, which are related to a running speed of the vehicle, are input to acquisition unit 20 via different transmission paths such as the conductive cable and CAN bus 200. Note that the same as above also applies to a case where information related to the ACC and information related to the ignition are input to acquisition unit 20 via the different transmission paths such as the conductive cable and CAN bus 200 without being limited to the information related to the running speed of the vehicle.

Moreover, acquisition unit 20 acquires information on a transmission by receiving a message, in which the information on the transmission is included as data, via CAN bus 200. In the information on the transmission, for example, a parking state is shown. The information on the transmission and the above-mentioned vehicle speed information are related to each other in indicating a running state of the vehicle. Note that these pieces of the information are each input to acquisition unit 20 via a common transmission path that is CAN bus 200. Acquisition unit 20 outputs the plural types of the state information to estimation unit 22.

Estimation unit 22 estimates the state of the vehicle based on any one of the plural types of the state information acquired in acquisition unit 20. Specifically, when the vehicle speed pulse and the vehicle speed information are acquired, since the conductive cable transmitting the vehicle speed pulse is more reliable than CAN bus 200 transmitting the vehicle speed information, the vehicle speed pulse is more reliable than the vehicle speed information. Therefore, when the reliabilities of such plural pieces of the state information on the related contents differ from one another, estimation unit 22 selects the state information having higher reliability. Note that, in advance, estimation unit 22 stores the reliability for each piece of the state information.

Meanwhile, since both the above-mentioned information on the transmission and the vehicle speed information are acquired via CAN bus 200, the reliabilities of these are equivalent to each other. Note that the information on the transmission is occasionally contradictory to the vehicle speed information. For example, there is a case where the information on the transmission indicates the parking state, but the vehicle speed information indicates 60 km/h. In such a case, estimation unit 22 selects state information in which the filtering rule is in a more strict state. The filtering rule is strict means, for example, that the number of pieces of the information included in the filtering rule is small. When the filtering rule is composed only of the CAN IDs, a filtering rule with a small number of CAN IDs can be said to be a strict filtering rule. Note that estimation unit 22 stores strictness of the filtering rule for each piece of the state information in advance.

Figure 7:
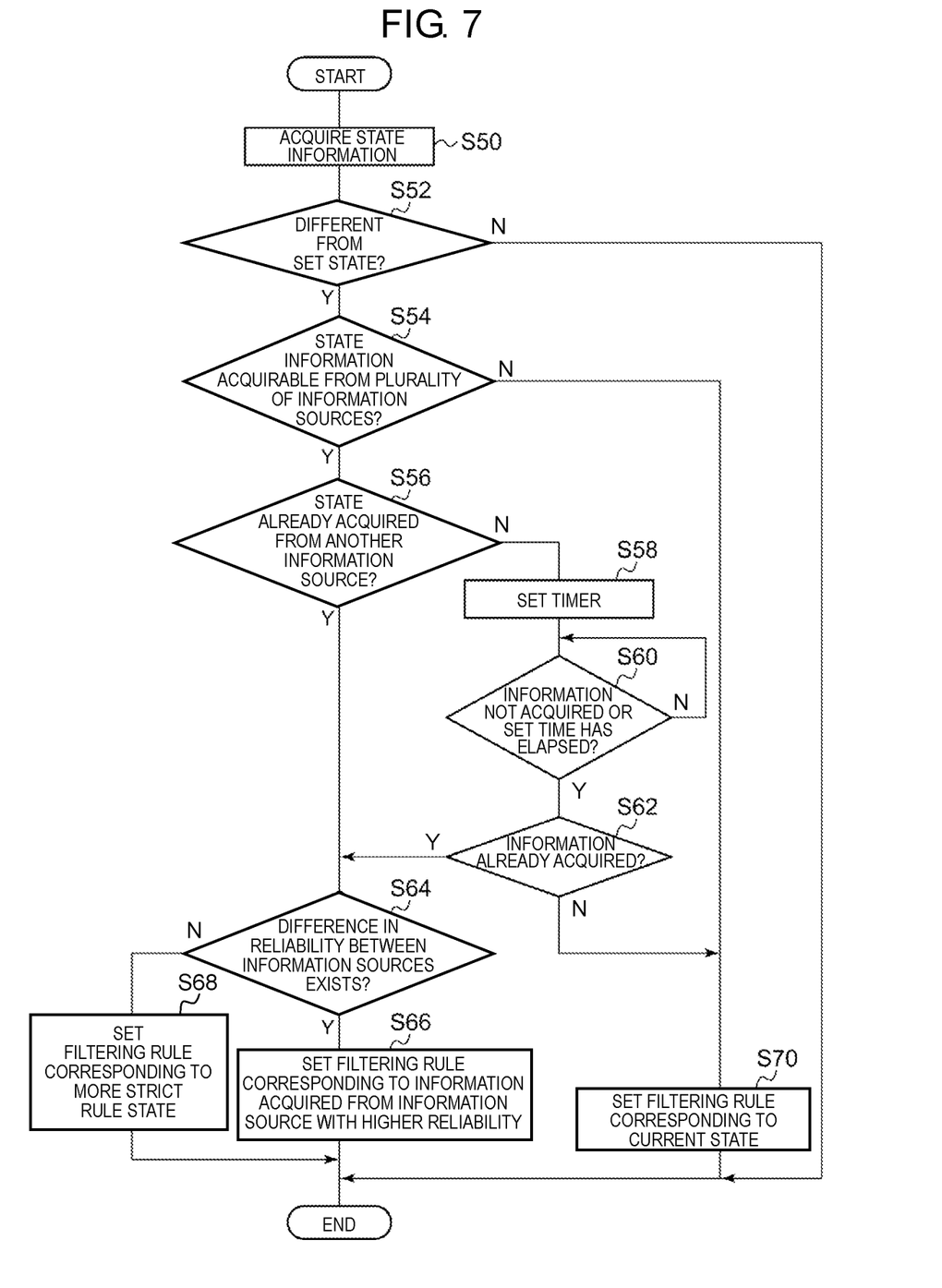
FIG. 7 is a flowchart illustrating a setting procedure performed by an ECU according to a second exemplary embodiment of the present invention.

An operation of ECU 100 configured as described above will now be described herein. FIG. 7 is a flowchart illustrating a setting procedure performed by ECU 100 according to the second exemplary embodiment of the present invention. Acquisition unit 20 acquires the state information (S50). In estimation unit 22, when the state in the state information is different from a set state (Y in S52), acquisition unit 20 is capable of acquiring the state information from a plurality of information sources (Y in S54), and has not acquired the state from another information source yet (N in S56), then setting unit 24 sets a timer (S58). If the information is not acquired or the set time has not elapsed (N in S60), setting unit 24 stands by. When the information is not acquired or the set time has elapsed (Y in S60), acquisition unit 20 has already acquired the information (Y in S62), and there is a difference in the reliability of the information source in estimation unit 22 (Y in S64), then setting unit 24 sets a filtering rule corresponding to information acquired from a highly reliable information source (S66).

If there is no difference in the reliability of the information source in estimation unit 22 (N in S64), setting unit 24 sets a filtering rule corresponding to a more strict filtering rule state (S68). When acquisition unit 20 has acquired the state from another information source (Y in S56), the process proceeds to Step 64. When acquisition unit 20 is not capable of acquiring the setting information from the plurality of information sources (N in S54), or alternatively, when acquisition unit 20 has not acquired the information yet (N in S62), then setting unit 24 sets the filtering rule corresponding to the current state (S 70). In estimation unit 22, if the state in the state information is not different from the set state (N in S52), then step 54 to step 70 are skipped.

According to this exemplary embodiment, when the plural types of the state information are acquired, the state information having higher accuracy is selected, and accordingly, the estimation accuracy for the state of the vehicle can be enhanced. Moreover, since the estimation accuracy for the state of the vehicle is enhanced, the detection accuracy for the unauthorized message can be enhanced. When the plural types of the state information are acquired, the state is estimated by selecting the state information corresponding to the strict filtering rule, and accordingly, the estimation accuracy for the state of the vehicle can be enhanced.

Third Exemplary Embodiment

Next, a third exemplary embodiment will be described. In a similar way to the above, the third exemplary embodiment relates to such a communication device that detects the unauthorized message in the CAN, that is, relates to the ECU. In the third exemplary embodiment, each of the plurality of ECUs transmits a command (hereinafter referred to as "Keep Alive command") for checking the operation state. Therefore, when another ECU that does not receive the Keep Alive command over a predetermined period is present, a certain ECU sets such a filtering rule to exclude a CAN ID of a message that can be transmitted from the other ECU. Meanwhile, the ECU sets such a filtering rule to enable reception of Keep Alive commands from all the ECUs. That is, when another ECU that is not in operation is present, the ECU does not transmit and receive the message to and from the other ECU, but transmits and receives the Keep Alive command to and from the other ECU. CAN system 500 and ECU 100 according to the third exemplary embodiment are of the same types as those of FIG. 1 and FIG. 3. Here, difference from the previous one will be mainly described.

Communication section 10 of FIG. 3 periodically transmits the Keep Alive command, and in addition, receives the Keep Alive command periodically transmitted from another ECU 100 that is in operation. Acquisition unit 20 acquires the Keep Alive command from the other ECU 100, which is connected to CAN bus 200, as the state information via communication section 10. The acquisition unit 20 outputs the acquired Keep Alive command to estimation unit 22.

Figure 8A:
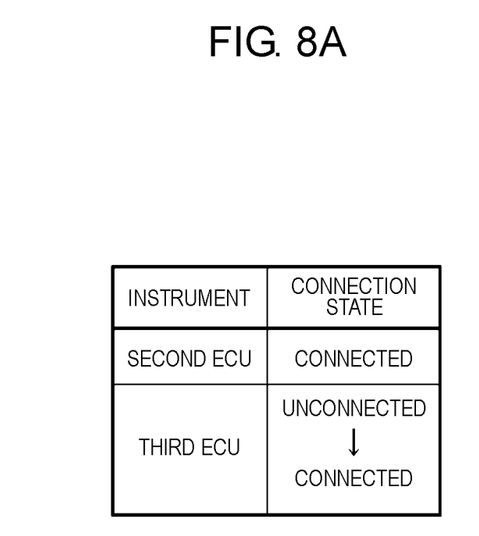
FIG. 8A is a table illustrating an operation outline of an ECU according to a third exemplary embodiment of the present invention.
Figure 8B:
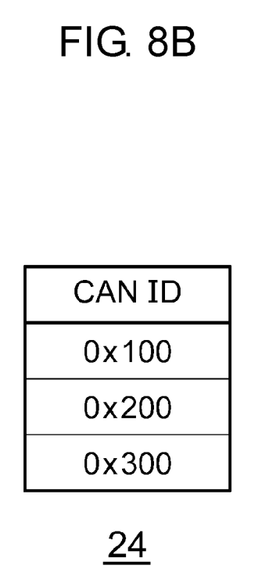
FIG. 8B is a table illustrating the operation outline of the ECU according to the third exemplary embodiment of the present invention.
Figure 8C:
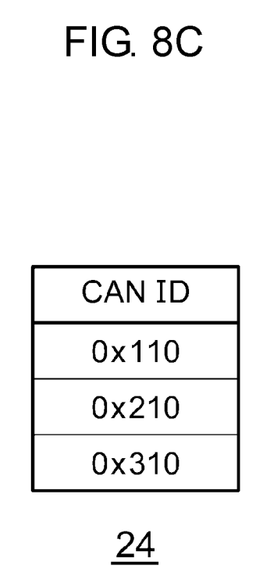
FIG. 8C is a table illustrating the operation outline of the ECU according to the third exemplary embodiment of the present invention.
Figure 8D:
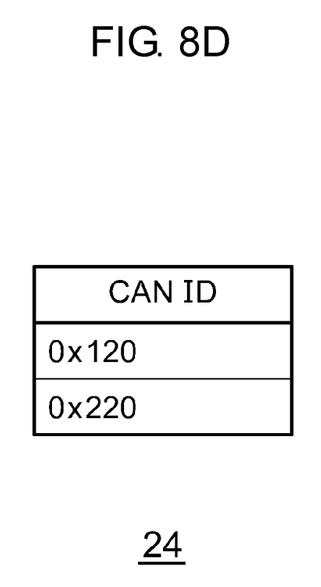
FIG. 8D is a table illustrating the operation outline of the ECU according to the third exemplary embodiment of the present invention.

Estimation unit 22 receives the Keep Alive command from acquisition unit 20. Based on the Keep Alive command, estimation unit 22 estimates the operation state of the other ECU 100 included in CAN system 500, which is provided in the vehicle, as the state of the vehicle. Estimation unit 22 outputs the estimated operation state to setting unit 24. FIGS. 8A to 8D illustrate an operation outline of ECU 100 according to the third exemplary embodiment of the present invention. FIG. 8A illustrates operation states of second ECU 100b and third ECU 100c, which are estimated in estimation unit 22 of first ECU 100a. In this case, it is estimated that second ECU 100b is connected, and that third ECU 100c shifts from "unconnected" to "connected". FIGS. 8B to 8D will be described later, and the description returns to FIG. 3.

Setting unit 24 receives the operation states from estimation unit 22. Setting unit 24 sets a filtering rule based on the operation states of the other ECUs 100, which are estimated in estimation unit 22. This setting of the filtering rule is made in the same way as before. FIG. 8B illustrates the filtering rule set in a state in which second ECU 100b is connected. As illustrated, "0x100", "0x200" and "0x300", which are such CAN IDs, are set. FIG. 8C illustrates the filtering rule set in a state in which third ECU 100c is connected. As illustrated, "0x110", "0x210" and "0x310", which are such CAN IDs, are set. FIG. 8D will be described later, and the description returns to FIG. 3.

When second ECU 100b is connected as illustrated in FIG. 8A, setting unit 24 sets the filtering rule illustrated in FIG. 8B. Moreover, as illustrated in FIG. 8A, when third ECU 100c shifts from "unconnected" to "connected", the filtering rule illustrated in FIG. 8C has not been set yet in a state in which third ECU 100c is unconnected, and accordingly, setting unit 24 sets the filtering rule illustrated in FIG. 8C subsequently to the fact that third ECU 100c is connected. Furthermore, setting unit 24 also sets a filtering rule capable of extracting the Keep Alive commands from the plurality of other ECUs 100 irrespective of the operation state of the other ECU 100. FIG. 8D illustrates CAN IDs corresponding to the Keep Alive command. Here, "0x120" as the CAN ID corresponds to the Keep Alive command from second ECU 100b. Moreover, "0x220" as the CAN ID corresponds to the Keep Alive command from third ECU 100c.

Figure 9:
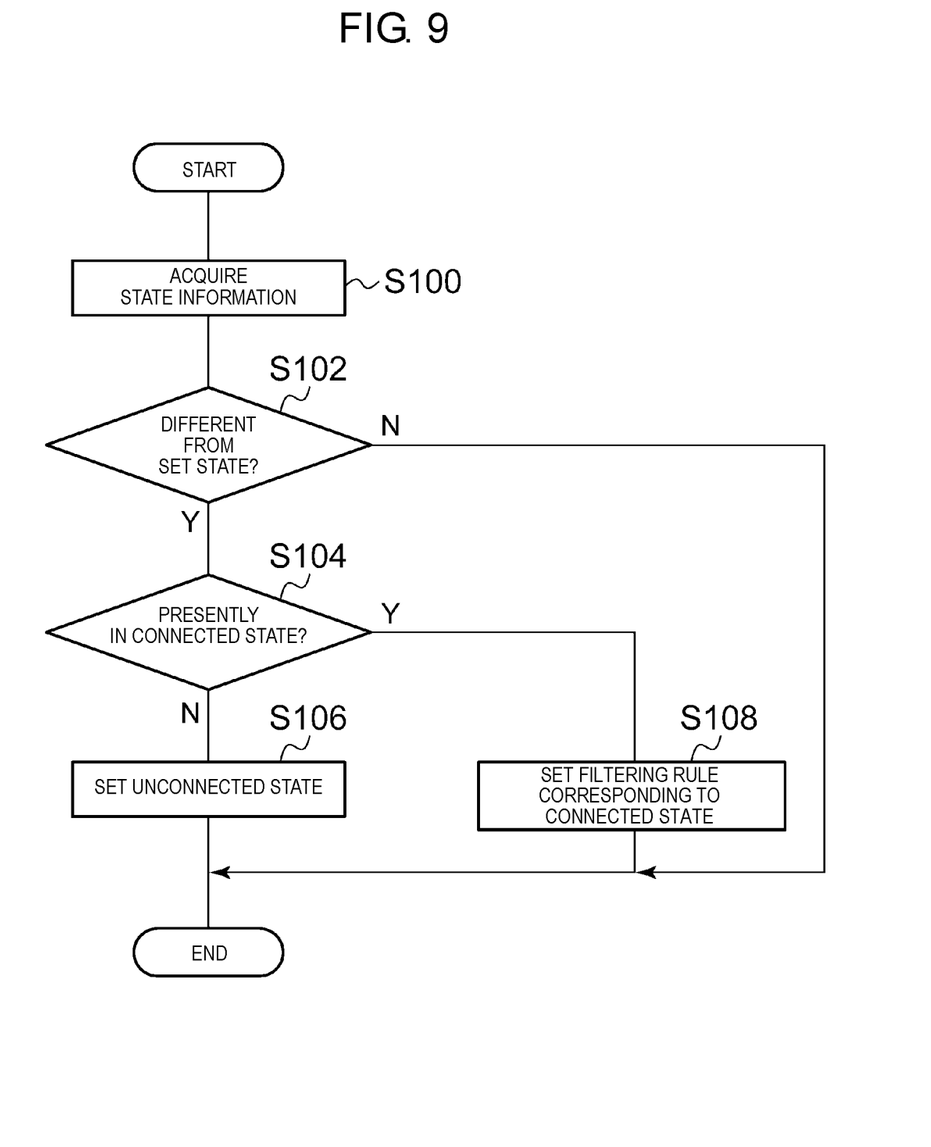
FIG. 9 is a flowchart illustrating a setting procedure performed by the ECU according to the third exemplary embodiment of the present invention.

An operation of ECU 100 configured as described above will now be described herein. FIG. 9 is a flowchart illustrating a setting procedure performed by ECU 100 according to the third exemplary embodiment of the present invention. Acquisition unit 20 acquires the state information (S100). In estimation unit 22, when the state in the state information is different from a set state (Y in S102), and when the current state is not a connected state (N in S104), setting unit 24 sets an unconnected state (S106). When the current state is the connected state (Y in S104), setting unit 24 sets a filtering rule corresponding to the connected state (S108). When the state in the state information is not different from the set state (N in S102), then estimation unit 22 skips step 104 to step 108.

According to this exemplary embodiment, since the filtering rule is set in response to the operation state of the other ECU, the message with the unconnected ECU can be excluded. Moreover, since the message with the unconnected ECU is excluded, the detection accuracy for the unauthorized message can be enhanced. Furthermore, since the filtering rule capable of extracting the Keep Alive commands from the plurality of the other ECUs is set irrespective of the operation state of the other ECU, such operation states of the other ECUs can be checked.

Note that, in this exemplary embodiment, the command for checking the operation state is used as the Keep Alive command. Alternatively, a configuration may be adopted, in which, with regard to a normal command (for example, a command for control) periodically transmitted by an arbitrary ECU, another arbitrary ECU recognizes this normal command as the Keep Alive command.

The present invention has been described above based on the exemplary embodiments. It will be understood by those skilled in the art that these exemplary embodiments are merely examples, that other exemplary modifications in which components and/or processes of the exemplary embodiments are variously combined are possible, and that the other exemplary modifications still fall within the scope of the present invention.

An aspect of the present invention is summarized below. A communication device according to a certain aspect of the present invention includes a communication section that transmits and receives a message, an acquisition unit that acquires state information, an estimation unit that estimates a state of an object, a setting unit that sets a filtering rule, and a filter unit. The communication section transmits and receives a message in a network. The acquisition unit acquires state information on a state of an object for which the network is provided. The estimation unit estimates the state of the object based on the state information acquired in the acquisition unit. The setting unit sets the filtering rule based on the state estimated in the estimation unit. The filter unit executes filtering processing for the message in accordance with the filtering rule set in the setting unit.

Accordance to this aspect, the filtering rule corresponding to the state of the object, which is estimated based on the state information, and accordingly, the detection accuracy for the unauthorized message can be enhanced.

The estimation unit may estimate a second state after estimating a first state, and the setting unit may make setting in a following order.

(1) When the first state is estimated in the estimation unit, the setting unit sets the filtering rule corresponding to the first state.
(2) When the transition from the first state to a second state is estimated in the estimation unit, the setting unit sets the filtering rule corresponding to the first state and a filtering rule corresponding to the second state over a predetermined period after the shift.
(3) After elapse of the predetermined period, the setting unit may set the filtering rule, which corresponds to the second state.

In this case, when the transition from the first state to the second state is estimated, the filtering rules corresponding to the first state and the second state are set, and accordingly, even if a deviation occurs between the estimated states, the detection accuracy for the unauthorized message can be enhanced.

The acquisition unit may acquire plural types of the state information, and the estimation unit may estimate the state of the object based on any one of the plural types of the state information acquired in the acquisition unit. In this case, since the state of the object is estimated based on any one of the plural types of the state information, the detection accuracy for the unauthorized message can be enhanced.

The acquisition unit may acquire, as the state information, a command for checking an operation state of another communication device connected to the network. The estimation unit may estimate, as the state of the object, the operation state of the other communication device based on the command acquired in the acquisition unit. The setting unit may also set a filtering rule capable of extracting commands from a plurality of the other communication devices in addition to setting a filtering rule corresponding to the operation state of the other communication device, which is estimated in the estimation unit. In this case, since the filtering rule capable of extracting the commands from the plurality of the other communication devices is set irrespective of the operation state of the other communication device, such operation states of the other communication devices can be checked.

Another aspect of the present invention is a communication method. This method includes transmitting and receiving a message, acquiring state information, estimating a state of an object, setting a filtering rule, and executing filtering processing. In the transmitting and receiving a message, a message in a network is transmitted and received. In the acquiring state information, state information on a state of an object for which the network is provided is acquired. In the estimating the state of the object, the state of the object is estimated based on the acquired state information. In the setting the filtering rule, a filtering rule is set based on the estimated state. In the executing filtering processing, filtering processing for the message is executed in accordance with the set filtering rule.

In each of the first to third exemplary embodiments, estimation unit 22 may estimate an attack/failure state for CAN system 500 provided in the vehicle, and setting unit 24 may set such a filtering rule to reduce an influence of the failure or the attack. Specific setting of the filtering rule will be illustrated below.

(1) Estimation unit 22 estimates a failure of another ECU 100 from a communication state of CAN bus 200, for example, communication interruption, failure information, and the like. Setting unit 24 sets such a filtering rule to exclude a message with the failed other ECU 100.
(2) Estimation unit 22 detects an occurrence of a Denial of Service attack (DoS attack) or the like from the communication state of CAN bus 200, for example, an increase in traffic volume. In order to realize a fail-safe control, setting unit 24 sets such a filtering rule to shut down the message.
(3) Estimation unit 22 detects a failure of its own ECU 100, for example, a failure of a sensor/actuator or the like, or detects an unauthorized modification of an upper layer, which is executed in application execution section 14. Setting unit 24 sets such a filtering rule not to transmit the unauthorized message to CAN bus 200.

Accordance to such an exemplary modification, a degree of freedom in configuration can be enhanced.

INDUSTRIAL APPLICABILITY

The present invention is applicable not only to the in-vehicle network but also to security in other networks.

REFERENCE MARKS IN THE DRAWINGS

10: communication section
12: processor
14: application execution section
20: acquisition unit
22: estimation unit
24: setting unit
26: storage unit
28: input unit
30: filter
32: output unit
50, 52, 54, 56, 58: rule storage
60, 62: filter
64: transmission cycle filter
66: transmission frequency filter
68: data filter
70: result determiner
200: CAN bus
500: CAN system

The invention claimed is:

1. A communication device, the communication device being included in a vehicle and connected to a plurality of other communication devices in the vehicle via a network, the plurality of other communication devices including a first other communication device and a second other communication device, the communication device comprising:
    a processor; and
    a memory including a program that, when executed, causes the processor to perform operations including:
    transmitting and receiving a message via the network;
    acquiring first state information on a state of the first other communication device and second state information on a state of the second other communication device;
    estimating a state of the vehicle based on the first state information and the second state information;
    selecting a filtering rule among a plurality of filtering rules based on the estimated state of the vehicle; and
    executing filtering processing for the message in accordance with the selected filtering rule, wherein
    when the estimated state of the vehicle is a transition state where the vehicle transitions from a first state to a second state,
    the plurality of filtering rules include a first filtering rule and a second filtering rule, the first filtering rule is selected when the plurality of other communication devices of the vehicle are in both the first state and the second state, the second filtering rule is selected when the plurality of other communication devices of the vehicle are all in the second state, and the vehicle switches from the transition state to the second state after a predetermined period.

2. The communication device according to claim 1, wherein the operations further include:

acquiring plural types of state information, and the estimated state of the vehicle is based on any one of the plural types of the state information.

3. The communication device according to claim 1, wherein a command for checking an operation state of the first other communication device is the first state information, the operation state of the first other communication device is estimated based on the command as the estimated state of the vehicle, and both a third filtering rule capable of extracting a command from the second other communication device and a fourth filtering rule corresponding to the operation state of the first other communication device are selected.

4. The communication device according to claim 1, wherein the first filtering rule is selected for the predetermined period of time to allow temporary communication between the first other communication device and the second other communication device when the vehicle is in the transition state, such that a communication between the first other communication device and the second other communication device is recognized as an authorized communication when the first other communication device and the second other communication device are in different states.

5. The communication device according to claim 1, wherein, after the predetermined period, communication between the first other communication device and the second other communication device is determined to be authorized if the first other communication device and the second other communication device are in a same state, and not authorized if the first other communication device and the second other communication device are in different states.

6. A communication method comprising:

transmitting and receiving a message in a network;

acquiring first state information on a state of a first communication device included in a vehicle and a second state information on a state of a second communication device included in the vehicle;

estimating a state of the vehicle based on the first state information and the second state information;

selecting a filtering rule among a plurality of filtering rules based on the estimated state of the vehicle; and executing filtering processing for the message in accordance with the selected filtering rule, wherein when the estimated state of the vehicle is a transition state where the vehicle transitions from a first state to a second state, the plurality of filtering rules include a first filtering rule and a second filtering rule, the first filtering rule is selected when the plurality of other communication devices of the vehicle are in both the first state and the second state, the second filtering rule is selected when the plurality of other communication devices of the vehicle are all in the second state, and the vehicle switches from the transition state to the second state after a predetermined period.

7. A non-transitory computer-readable recording medium recording a program for causing a computer to execute a process, the process comprising:

transmitting and receiving a message in a network;

acquiring first state information on a state of a first communication device included in a vehicle and second state information on a state of a second communication device included in the vehicle;

estimating a state of the vehicle based on the first state information and the second state information;

selecting a filtering rule among a plurality of filtering rules based on the estimated state of the vehicle; and executing filtering processing for the message in accordance with the selected filtering rule, wherein when the estimated state of the vehicle is a transition state where the vehicle transitions from a first state to a second state, the plurality of filtering rules include a first filtering rule and a second filtering rule, the first filtering rule is selected when the plurality of other communication devices of the vehicle are in both the first state and the second state, the second filtering rule is selected when the plurality of other communication devices of the vehicle are all in the second state, and the vehicle switches from the transition state to the second state after a predetermined period.

* * * * *